(12) United States Patent
Scaggs et al.

(10) Patent No.: US 7,742,212 B2
(45) Date of Patent: Jun. 22, 2010

(54) PRECISION LASER MACHINING APPARATUS

(75) Inventors: Michael J. Scaggs, 1612 Eastlake Way, Weston, FL (US) 33326; Thomas Schoelzel, Pompano Beach, FL (US)

(73) Assignee: Michael J. Scaggs, Weston, FL (US)

( * ) Notice: Subject to any disclaimer, the term of this patent is extended or adjusted under 35 U.S.C. 154(b) by 46 days.

(21) Appl. No.: 12/340,023

(22) Filed: Dec. 19, 2008

(65) Prior Publication Data

US 2009/0095721 A1    Apr. 16, 2009

Related U.S. Application Data

(63) Continuation-in-part of application No. 11/674,730, filed on Feb. 14, 2007, now Pat. No. 7,489,429.

(51) Int. Cl.
*G02B 26/08* (2006.01)
(52) U.S. Cl. .............. 359/202.1; 359/201.1; 359/209.1; 219/121.75; 219/121.78; 219/121.8
(58) Field of Classification Search ........................ None
See application file for complete search history.

(56) References Cited

U.S. PATENT DOCUMENTS

| 382,787 | A | 5/1888 | Woolfolk |
|---|---|---|---|
| 3,576,965 | A | 5/1971 | Gottfried |
| 3,720,454 | A | 3/1973 | Inderhees |
| 4,079,230 | A | 3/1978 | Miyauchi et al. |
| 4,118,109 | A | 10/1978 | Crawford et al. |
| 4,160,894 | A | 7/1979 | Stemmler et al. |
| 4,822,974 | A | 4/1989 | Leighton |
| 4,896,944 | A | 1/1990 | Irwin et al. |
| 4,940,881 | A | 7/1990 | Sheets |
| 5,293,025 | A | 3/1994 | Wang |
| 6,501,045 | B1 | 12/2002 | Bernstein et al. |

*Primary Examiner*—James Phan
(74) *Attorney, Agent, or Firm*—Ronald E. Smith; Smith & Hopen, P.A.

(57) ABSTRACT

A focused laser beam having an optical axis passes sequentially through a simple, positive lens, a pair of plane, parallel windows, and a second, simple, negative lens. Each of the plane, parallel windows are mounted to a galvanometer motor and positioned orthogonally to one another. The focused laser beam is therefore displaced in a controlled manner from the optical axis to enable laser machining of very precise geometric features over a large processing window. A field size of one thousand microns is achieved.

2 Claims, 1 Drawing Sheet

PRECISION LASER MACHINING APPARATUS

CROSS-REFERENCE TO RELATED DISCLOSURES

This disclosure is a continuation-in-part application claiming the benefit of the filing date of pending U.S. patent application entitled: "Precision Laser Machining Apparatus," by the same inventors, filed Feb. 14, 2007, bearing Ser. No. 11/674,730 now U.S. Pat. No. 7,489,429.

BACKGROUND OF THE INVENTION

1. Field of the Invention

This invention relates to optical scanning devices used for laser machining. More particularly, it relates to a high precision laser hole drilling and controlled material removal of geometries of less than 500 microns.

2. Description of the Prior Art

Galvanometer scanners have been used for nearly three (3) decades for laser material processing. They are most commonly used for laser marking. They have less utility in fine machining applications, in particular drilling precision holes and features below 250 microns, because their positional accuracy is limited below such threshold. Non-galvo-based approaches are limited to circular features and tend to be more optically and mechanically complex. Galvanometer-based systems are the simplest and least expensive way to direct a focused laser beam over a wide area. Nevertheless, they lack the "localized" precision for finite features over a large field.

Thus there is a need for a galvanometer-based apparatus that includes localized precision for finite features over a large field.

A conventional multi-mirror galvometric system positions a focused laser beam by moving the mirrors by means of vectors. There are no "true arcs" generated for circular features. Instead, a circle is approximated by a series of short vectors. It is very difficult to form precision holes or any arc feature below 200 microns in diameter. Moreover, the angular resolution of the galvo motors is a further hindrance to the problem of small features and the attainment of high repeatability.

Thus there is a need for a system that is not detrimentally affected by the formation of circles and arcs through a series of short vectors.

The known systems are also subject to limited angular resolution and thermal drift which further hinders the ability of the device to machine precision features over a long period of time, e.g., a single production shift in manufacturing.

There is a need, therefore, for a system that is less subject to the effects of limited angular resolution and thermal drift so that features can be machined over relatively long periods of time.

A need therefore exists for a device having an improved angular resolution relative to the known devices that have a pair of galvometrically driven mirrors.

Rotating, offset wedge pairs allow good precision below 250 microns, but they only permit circular features and have a limited dynamic range. The focus lens itself can be placed offset from the optical axis and rotated or even placed in an open frame X-Y stage used to make all conceivable geometries but mounting a lens in such a way is bulky and limited over the area that can be machined due to common lens aberrations.

There is thus a need for a device not subject to the limitations of rotating, offset wedge pairs or a rotating, offset focus lens.

Another known method, disclosed in U.S. Pat. No. 4,079,230, includes a pair of matched optical wedges that are rotationally offset and rotated in unison at high speeds. The offset of the matched wedges causes an angular displacement of the laser beam from the original optical axis. This angular deviation causes a lateral displacement of the focal spot when the angularly displaced beam is passed through a focus lens. The difficulty with this technique is that it is hard to coordinate the two wedges precisely at the high rotational speeds or to rapidly change the desired angle of deviation during such rotation. This technique usually requires a multitude of wedge pairs to cover a wide diameter range. The requirement to change wedge pairs adds significant time to replace and align; it is therefore unsatisfactory for most production processes. This method also limits the geometries to circular patterns only.

Other methods include "wobble plates" disclosed in U.S. Pat. Nos. 4,940,881 and 6,501,045 that provide circular and tapered features only and have limited workability in imaged based optical systems.

Another method, disclosed in U.S. Pat. No. 4,896,944, employs an offset focus lens that is rotated to displace the focused spot radially from the optical axis. Such systems are bulky but have utility when fixed diameter holes are required. They lack utility in creating complex features or tapers.

Thus there is a need for a system that has increased versatility relative to the known systems. More specifically, there is a need for a system that can provide complex shapes, including tapers and other non-circular shapes, and which can form features less than two hundred fifty microns (250 µm).

However, in view of the art considered as a whole at the time the present invention was made, it was not obvious to those of ordinary skill in this art how the identified needs could be met.

SUMMARY OF INVENTION

This invention provides a simple optical, electro-mechanical and software approach to directing a focused laser beam onto materials to machine simple and complex geometries. The novel structure provides the ease of use and simplicity of a galvo system but adds the "localized" precision lacking heretofore.

The novel device has utility for laser machining of very precise geometric features over a large processing window. It includes a simple, positive lens, and a pair of plane, parallel windows. Each of the plane, parallel windows is mounted to a galvanometer motor and is positioned orthogonally to one another;

The novel structure further includes a second, negative lens in optical alignment with the simple, positive lens and the two plane, parallel windows.

A laser beam having an optical axis is adapted to pass sequentially through the simple, positive lens, through the pair of plane, parallel windows, and through the second, negative lens.

A focused laser beam is therefore displaced in a controlled manner from said optical axis. Moreover, a field size of more than one thousand microns is achieved.

In a preferred embodiment, a computer optical design program is employed to optimize the curvatures of the simple, positive lens and the simple, negative lens to minimize the influence of spherical aberration, coma and astigmatism on the focused spot.

The novel structure provides the precision and accuracy comparable to an air bearing X-Y stage that moves under a fixed focused laser beam but without the high cost and higher inertia of moving such stage and the part. The present invention, in essence, demagnifies the scan field by more than two (2) orders of magnitude.

A common scanner with fair resolution can have a scan field of 50 mm×50 mm with an F-Theta lens having a focal length of 100 mm. This same scanner has great difficulty providing high accuracy of geometries below 250 micron, due to the angular resolution of the system and the fact that any curved features include a large number of straight vectors.

The primary object of this invention is to create an optical system that precisely and repeatedly locates a concentrated laser beam.

A closely related object is to manipulate the beam laser in such a way as to remove a wide variety of materials in a controlled way to generate complex geometries with excellent precision and repeatability.

BRIEF DESCRIPTION OF THE DRAWINGS

For a fuller understanding of the invention, reference should be made to the following detailed description, taken in connection with the accompanying drawing, in which:

The FIGURE is a diagram of a laser beam passing through a simple, positive lens, a pair of plane, parallel windows, and a fourth ($4^{th}$) optic.

DETAILED DESCRIPTION OF THE PREFERRED EMBODIMENT

Figure 1:
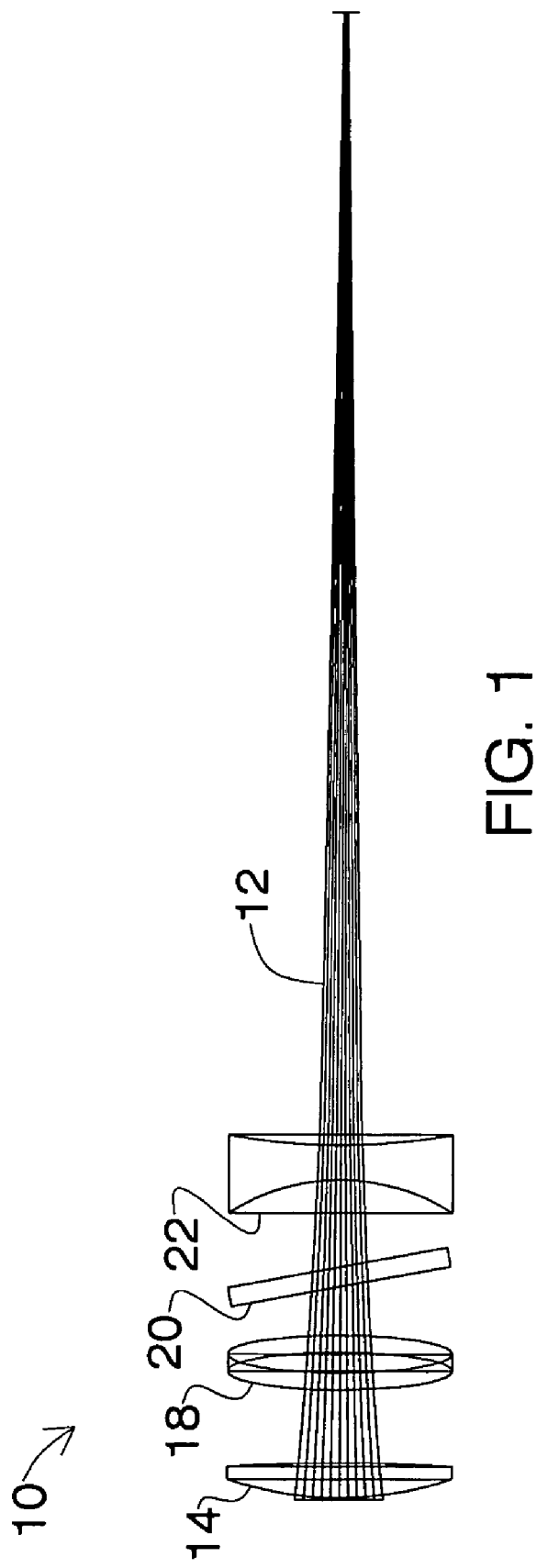

Referring now to the FIGURE, there it will be seen that an illustrative embodiment of the invention is denoted as a whole by the reference numeral 10.

Incoming laser beam 12 passes through simple, positive lens 14 and then through a pair of plane, parallel windows 18, 20. Each of said plane, parallel windows is mounted to a galvanometer motor and is positioned orthogonally to one another.

Simple, positive lens 14 and negative lens 22 are optimized with a computer optical design program to minimize aberrations (spherical, coma and astigmatism) of the system. There are many commercially available programs to perform the optimization, such as Zemax®, OSLO®, CODE V®, and Beam 3®, to name a few. All have utility in optical design work and perform essentially the same function.

As is well known, the variables that can be optimized in a computer optical design program are the radius of curvature of each lens, type of glass, glass thickness and spacing between lenses. A desired focal length of the system is established and then the front surface of each lens is optimized. The positive lens curvature is then fixed and re-optimized and the rest of the variables for a given focal length are then re-optimized. This procedure is well known by those skilled in the art and familiar with optical design software.

Second lens 22 is a negative element that is optimized for the lateral displacement caused by the parallel plates 18, 20 on the galvanometers. This increases the field size from a nominal 200 microns to well over 1 mm (1000 microns), depending upon the index of refraction of the parallel plates 18, 20 and the radius of curvature of the simple, positive lens 14 and the simple, negative lens 22. It will be clear to those skilled in the art that both the simple, positive lens 14 and simple, negative lens 22 each could be made into doublet lenses, achromats or even triplets to further reduce aberrations as may be required for certain applications to obtain the smallest possible focused spot size for a given displacement from the optical axis.

The galvanometer motor is used to tilt each window 18, 20 perpendicular to one another to thereby displace the laser beam from the original optical axis. The preferred optical material is the highest possible index material for the desired laser wavelength. Having a high index allows the thickness of the optics to be as thin as possible to minimize optical aberrations and minimize the inertia on the galvanometer.

Plates 18 and 20 are identical but they appear different in the FIGURE because one is tilted about the X axis and the other about the Y axis. Moreover, the plane, parallel plates provide a lateral shift from the optical axis such that the light is still within the paraxial regime of the optical system so that aberrations are minimized. Nevertheless, the small lateral shift causes a slight decenter on the negative lens which introduces an angular deviation as the light propagates through the negative lens and this is what achieves the larger scan field.

The resulting focused light is directed onto a material such as a metal, plastic, glass or ceramic for machining.

Either or both of simple, positive input lens 14 and simple, negative output lens 22 can be split into multi-element components, i.e., an equivalent of positive input lens 14 can be an achromat (2 lenses, color corrected) and equally the output negative lens 22 can be a negative achromat. This can be taken even further to make each lens a triplet or even more elements; there are no limits in this regard.

As an application may demand, the novel design can be pushed by splitting lenses 14 and 22 to further enhance their aberration and focusability performance. In actual practice this is likely the exception but nonetheless it is possible and will be clear to those skilled in the art. As an illustration, suppose a plano convex lens focuses to a spot diameter X; by optimizing the plano surface to a curved surface for a given input diameter, the spot diameter X can be reduced by some factor N. By splitting the lens into two (2) components and optimizing the curvatures, glass, glass thicknesses and element spacing, the X spot diameter can further be reduced by some factor NN. If the lens is split into three (3) components and the glass, curvatures, thicknesses and spacing are optimized, the X spot diameter can further be reduced by some factor NNN. This can be continued even further but at some point the cost is prohibitive for the improvement made in reduced spot size or resolution as is well known by those skilled in the art.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A device for laser machining very precise geometric features over a large processing window, comprising:
   - a simple, positive lens;
   - a pair of plane, parallel windows;
   - each of said plane, parallel windows being mounted to a galvanometer motor and being positioned orthogonally to one another;
   - a second, simple, negative lens;
   - a laser beam having an optical axis;
   - said laser beam adapted to pass sequentially through said simple, positive lens, through said pair of plane, parallel windows, and through said second, negative lens;
   - whereby a focused laser beam is displaced in a controlled manner from said optical axis; and
   - whereby a field size of one thousand microns is achieved.

2. The device of claim 1, further comprising:
   - employing a computer optical design program to optimize curvatures of said simple, positive lens and said simple, negative lens.

* * * * *